(12) United States Patent
Nelson

(10) Patent No.: US 6,527,078 B1
(45) Date of Patent: Mar. 4, 2003

(54) STEERING SYSTEM FOR REAR WHEELS OF A TRAILER

(76) Inventor: Melvin J. Nelson, 9847 Mc Grath Road South, Rosedale, BC (CA), V0X 1X0

( * ) Notice: Subject to any disclaimer, the term of this patent is extended or adjusted under 35 U.S.C. 154(b) by 0 days.

(21) Appl. No.: 09/922,284

(22) Filed: Aug. 3, 2001

(51) Int. Cl.$^7$ .................................................. B62D 5/20
(52) U.S. Cl. ........................ 180/437; 180/411; 180/414
(58) Field of Search ................................. 280/421, 445, 280/442, 426, 99, 100; 180/235, 237, 408, 409, 424, 434, 437, 411, 414

(56) References Cited

U.S. PATENT DOCUMENTS

| | | |
|---|---|---|
| 2,333,853 A | 11/1943 | Fellabaum |
| 3,561,790 A | 2/1971 | Jurgens |
| 3,806,160 A | 4/1974 | Duerksen |
| 4,212,483 A | 7/1980 | Howard |
| 4,463,966 A | 8/1984 | Stoddard |
| 4,468,047 A | 8/1984 | McGhie et al. |
| 4,702,488 A | 10/1987 | Baillie |
| 5,035,439 A * | 7/1991 | Petrillo ...................... 280/81.6 |
| 5,201,836 A | 4/1993 | DeWitt |
| 5,213,353 A | 5/1993 | Williams |
| 5,244,226 A | 9/1993 | Bergh |
| 5,289,892 A | 3/1994 | Notsu |
| 5,607,028 A * | 3/1997 | Braun et al. ................. 180/408 |
| 6,131,691 A * | 10/2000 | Morch ......................... 180/418 |

* cited by examiner

Primary Examiner—Avraham Lerner

(57) ABSTRACT

A steering system for rear wheels of a trailer for more easily and precisely steering a back end of the trailer when the trailer is moving in a reverse direction. The steering system for rear wheels of a trailer includes a steering assembly mountable on the trailer for pivotally moving the rear wheels of the trailer. A joining member is provided for joining the steering assembly to the cab of the semi-truck. A first end of the joining member is operationally coupled to the steering assembly and second end of the joining member is operationally coupled to an actuator assembly for actuating the joining member.

19 Claims, 3 Drawing Sheets

STEERING SYSTEM FOR REAR WHEELS OF A TRAILER

BACKGROUND OF THE INVENTION

1. Field of the Invention

The present invention relates to steering systems and more particularly pertains to a new steering system for rear wheels of a trailer for more easily and precisely steering a back end of the trailer when the trailer is moving in a reverse direction.

2. Description of the Prior Art

The use of steering systems is known in the prior art. More specifically, steering systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 3,561,790; 2,333,853; 3,806,160; 5,244,226; 4,212,483; and 4,463,966.

While these devices fulfill their respective, particular objectives and requirements, the aforementioned patents do not disclose a new steering system for rear wheels of a trailer. The inventive device includes a steering assembly mountable on the trailer for pivotally moving the rear wheels of the trailer. A joining member is provided for joining the steering assembly to the cab of the semi-truck. A first end of the joining member is operationally coupled to the steering assembly and second end of the joining member is operationally coupled to an actuator assembly for actuating the joining member.

In these respects, the steering system for rear wheels of a trailer according to the present invention substantially departs from the conventional concepts and designs of the prior art, and in so doing provides an apparatus primarily developed for the purpose of more easily and precisely steering a back end of the trailer when the trailer is moving in a reverse direction.

SUMMARY OF THE INVENTION

In view of the foregoing disadvantages inherent in the known types of steering systems now present in the prior art, the present invention provides a new steering system for rear wheels of a trailer construction wherein the same can be utilized for more easily and precisely steering aback end of the trailer when the trailer is moving in a reverse direction.

The general purpose of the present invention, which will be described subsequently in greater detail, is to provide a new steering system for rear wheels of a trailer apparatus and method which has many of the advantages of the steering systems mentioned heretofore and many novel features that result in a new steering system for rear wheels of a trailer which is not anticipated, rendered obvious, suggested, or even implied by any of the prior art steering systems, either alone or in any combination thereof.

To attain this, the present invention generally comprises a steering assembly mountable on the trailer for pivotally moving the rear wheels of the trailer. A joining member is provided for joining the steering assembly to the cab of the semi-truck. A first end of the joining member is operationally coupled to the steering assembly and second end of the joining member is operationally coupled to an actuator assembly for actuating the joining member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new steering system for rear wheels of a trailer apparatus and method which has many of the advantages of the steering systems mentioned heretofore and many novel features that result in a new steering system for rear wheels of a trailer which is not anticipated, rendered obvious, suggested, or even implied by any of the prior art steering systems, either alone or in any combination thereof.

It is another object of the present invention to provide a new steering system for rear wheels of a trailer which may be easily and efficiently manufactured and marketed.

It is a further object of the present invention to provide a new steering system for rear wheels of a trailer which is of a durable and reliable construction.

An even further object of the present invention is to provide a new steering system for rear wheels of a trailer which is susceptible of a low cost of manufacture with regard to both materials and labor, and which accordingly is then susceptible of low prices of sale to the consuming public, thereby making such steering system for rear wheels of a trailer economically available to the buying public.

Still yet another object of the present invention is to provide a new steering system for rear wheels of a trailer which provides in the apparatuses and methods of the prior art some of the advantages thereof, while simultaneously overcoming some of the advantages normally associated therewith.

Still another object of the present invention is to provide a new steering system for rear wheels of a trailer for more easily and precisely steering a back end of the trailer when the trailer is moving in a reverse direction.

Yet another object of the present invention is to provide a new steering system for rear wheels of a trailer which includes a steering assembly mountable on the trailer for pivotally moving the rear wheels of the trailer. A joining member is provided for joining the steering assembly to the cab of the semi-truck. A first end of the joining member is operationally coupled to the steering assembly and second end of the joining member is operationally coupled to an actuator assembly for actuating the joining member.

Still yet another object of the present invention is to provide a new steering system for rear wheels of a trailer that saves a user time by allowing the user to more easily and precisely maneuver a back end of the trailer when moving in a reverse direction. The present invention will save a user time by reducing the number of times a user may have a keep maneuvering the trailer to position it in a specific location.

Even still another object of the present invention is to provide a new steering system for rear wheels of a trailer that reduces the likelihood of accidents occurring from a user having to repeatedly maneuver the trailer. Frustration can build in a user having to repeatedly maneuver a trailer to correctly position the trailer. The frustration can lead to impatience that can cause accidents. The present invention reduces the number of times required for maneuvering the trailer, thus reducing the user's frustration and impatience.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive manner in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
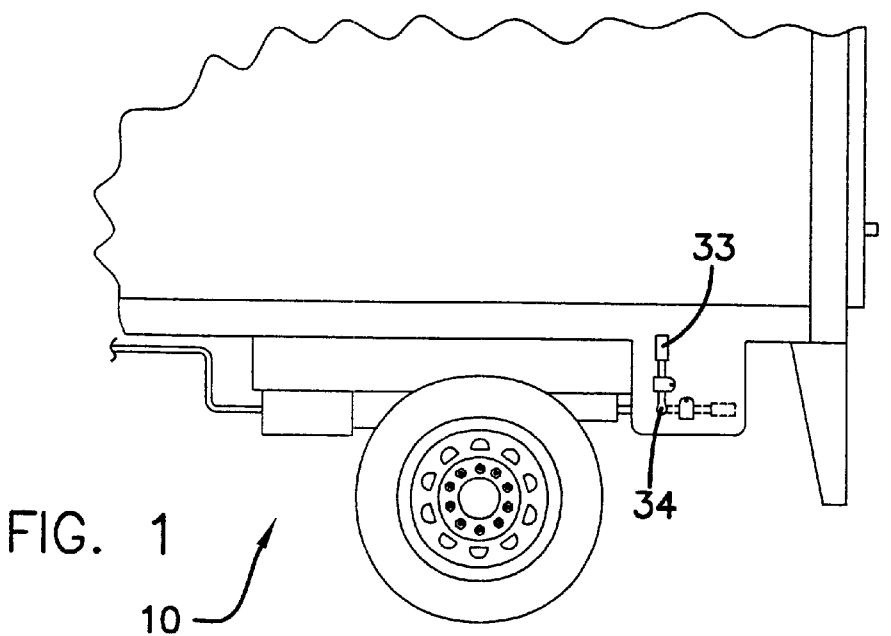
FIG. 1 is a schematic frontal view of a new steering system for rear wheels of a trailer according to the present invention.
Figure 2:
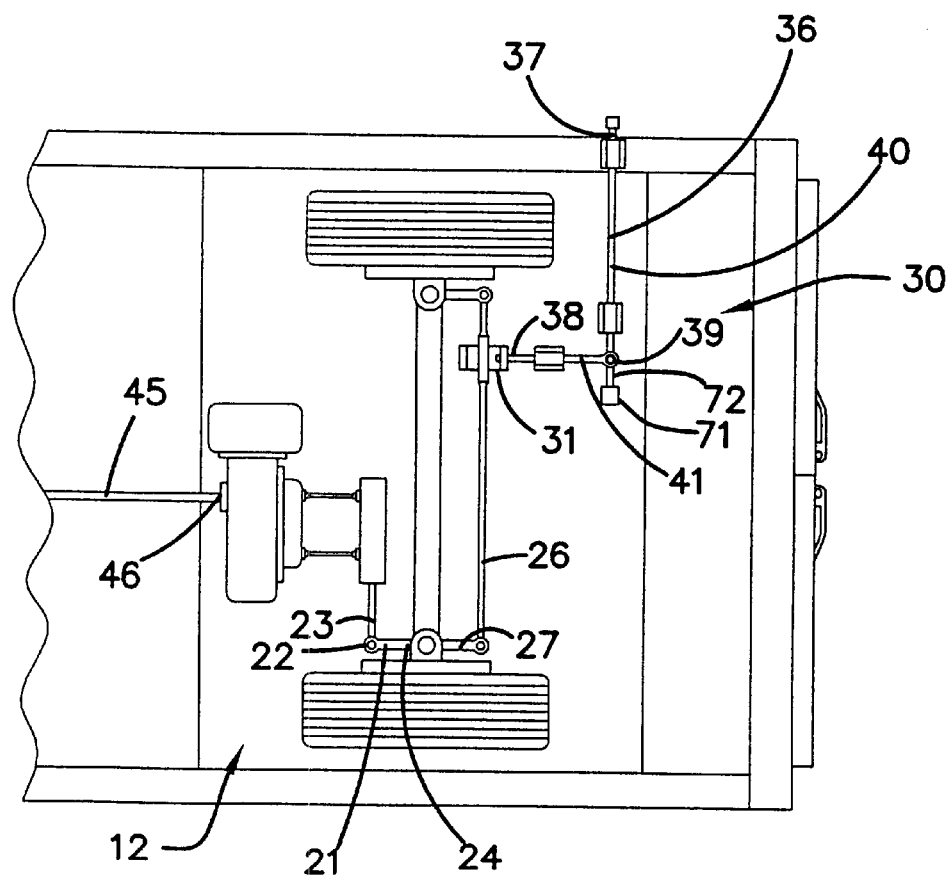
FIG. 2 is a schematic bottom view of the present invention.
Figure 3:
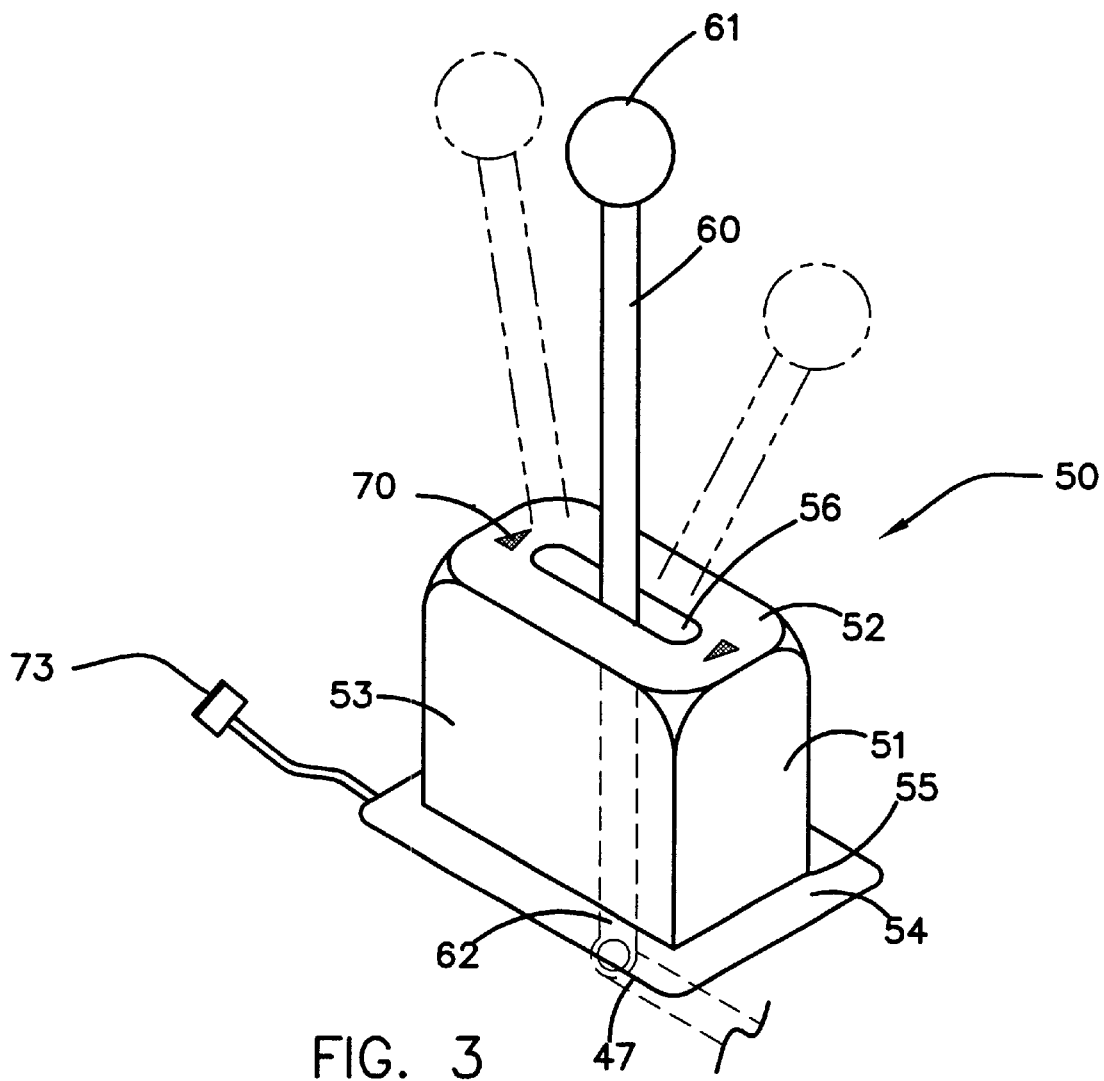
FIG. 3 is a schematic perspective view of the present invention showing a switch.
Figure 4:
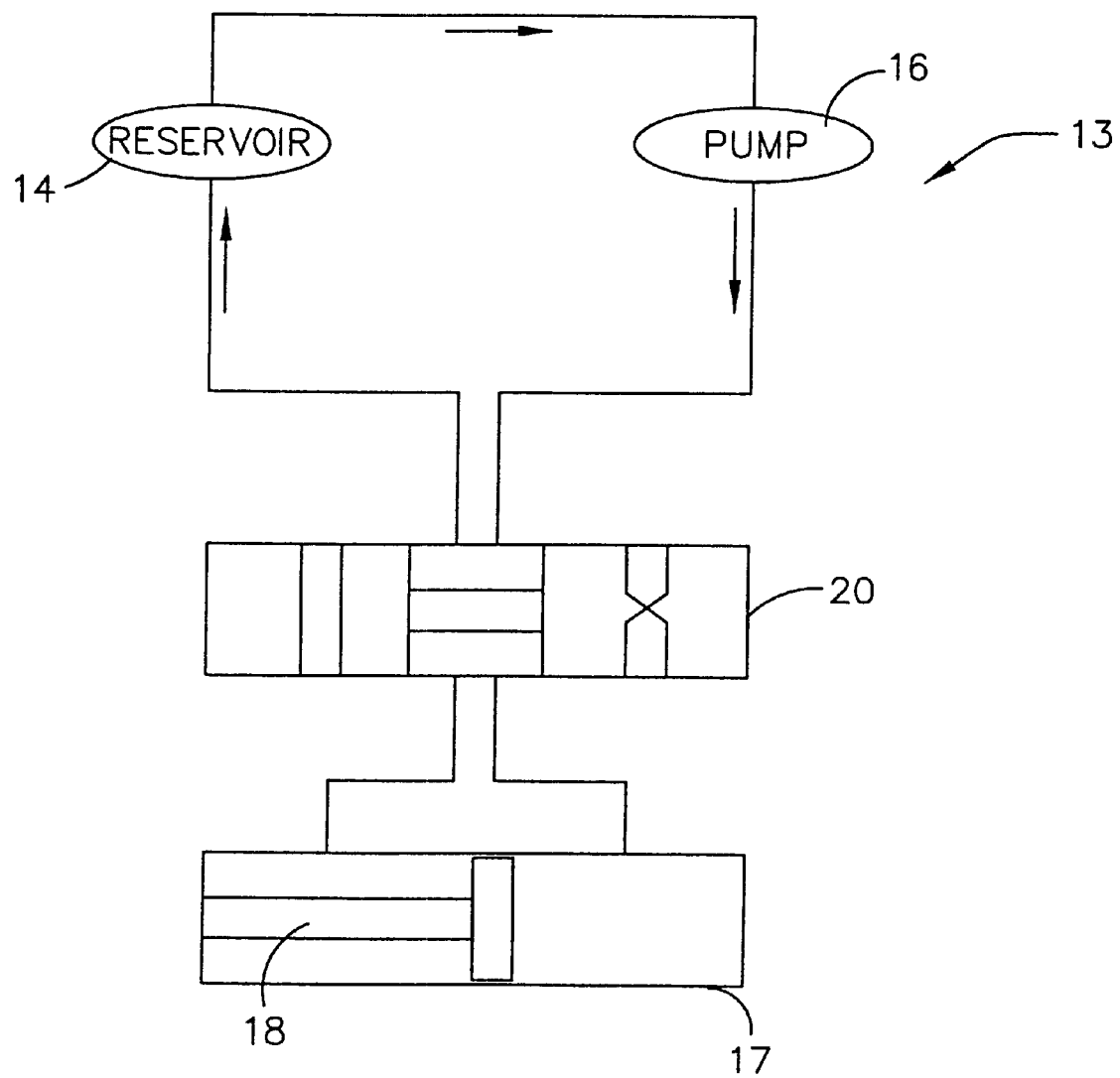
FIG. 4 is a schematic digram of the present invention.

With reference now to the drawings, and in particular to FIGS. 1 through 4 thereof, a new steering system for rear wheels of a trailer embodying the principles and concepts of the present invention and generally designated by the reference numeral 10 will be described.

As best illustrated in FIGS. 1 through 4, the steering system for rear wheels of a trailer 10 generally comprises a steering assembly 12 mountable on the trailer for pivotally moving the rear wheels of the trailer. The steering assembly 12 pivotally moves the rear wheels between a first position, a second position and a third position with respect to a longitudinal axis of the trailer when the trailer is moving in a reverse direction.

In one embodiment of the present invention, the first position is characterized by each of the rear wheels being positioned such that the trailer moves in a leftward direction with respect to the longitudinal axis of the trailer. The second position is characterized by each of the rear wheels being positioned such that the trailer moves in a rightward direction with respect to the longitudinal axis of the trailer. The third position is characterized by the wheels being position such that the trailer moves in a straight direction when the trailer travels in a forward or reverse direction.

In one embodiment of the present invention, the steering assembly 12 may include a dual-acting pump assembly 13 for pivotally moving the rear wheels between each of the positions. The dual-acting pump assembly 13 may include a reservoir 14 for holding a fluid such as, for example, hydraulic fluid or air. The reservoir 14 is preferably mounted on a lower surface of the bed of the trailer.

A pump 16 may be provided for pumping fluid from the reservoir 14 and for pumping fluid away from the pump 16. The pump 16 is fluidly coupled to the reservoir 14. A cylinder 17 may be provided for receiving fluid flowing from the pump 16. The cylinder 17 is fluidly coupled to the pump 16 and fluidly coupled to the reservoir 14. A piston 18 may be provided for moving the rear wheels between each of the positions. The piston 18 is preferably slidably mounted in the cylinder 17.

A three-position valve 20 may be provided for positioning the piston 18 between each of the positions. The three-position valve 20 is preferably fluidly coupled to the pump 16 and the reservoir 14. The three-position valve 20 is fluidly coupled to the cylinder 17. In one embodiment of the present invention, fluid flowing from the pump 16 and traveling through the three-position valve 20 moves the piston 18 between each of the positions.

A linkage 21 may be provided for coupling the piston 18 to one of the rims of the wheels. A first end 22 of the linkage 21 is coupled to an end 23 of the piston 18. A second end 24 of the linkage 21 is coupled to the rim of the wheel.

An elongated coupled member 26 may be provided for coupling the rims of each of the wheels together. The coupling member 26 may include a pair of end portions 27 pivotally extending away therefrom. Each end portion 27 may be pivotally coupled to one of the rims of the wheels. In one embodiment of the present invention, the coupling member 26 transfers a directional movement of the rear wheel coupled to the piston 18 to the rear wheel not coupled to the piston 18.

A securing assembly 30 may be provided for securing the wheels in the third position. The securing assembly 30 may include a clamp member 31 for clamping on to the coupling member 26 and preventing the coupling member 26 from moving from the third position toward the first or second position.

The securing assembly 30 may also include a lever 33 for removably securing the clamp member 31 to a portion of the coupling member 26. An end 34 of the lever 33 may be pivotally mounted on the bed of the trailer. The lever 33 is positionable between an engaged position and a disengaged position. In one embodiment of the present invention, the engaged position is characterized by the clamp member 31 being coupled to the coupling member 26.. The disengaged member is characterized by the clamp member 31 being disengaged from the coupling member 26.

A connecting member 36 may be provided for connecting the lever 33 to the clamp member 31. The connecting member 36 includes a first end 37 and a second end 38. The first end 37 of the connecting member 36 is coupled to the lever 33. The clamp member 31 is mounted on the second end 38 of the connecting member 36. The connecting member 36 may include a bend 39 therein such that a first connecting portion 40 and a second connecting portion 41 of the connecting member 36 are defined. In one embodiment of the present invention, the first connecting portion 40 is coupled to the lever 33 and the second connecting portion 41 is coupled to the clamp member 31.

In one embodiment of the present invention, moving the lever 33 from the disengaged position toward the engaged position rotates the first connecting portion 40 of the connecting member 36 along a longitudinal axis of the first connecting portion 40. Rotational movement of the first connecting portion 40 rotates the second connecting portion 41 in a plane oriented generally perpendicular to the first connecting portion 40 causing the clamp member 31 to engage the coupled member 26 in the engaged position.

In an alternate embodiment of the present invention, a user in the cab of the vehicle may remotely operate the securing assembly 30. The alternate embodiment of the present invention may employ a motor 71 for remotely operating the securing assembly 30. The motor 71 may be mountable to a lower surface of the bed of the trailer. The motor 71 includes a motor shaft 72 extending away from the motor 71. The motor 71 may be electrically connectable to a power supply of the vehicle.

The motor shaft 72 may be mounted to the second connecting portion 41 of the connecting member 36. In one embodiment of the present invention, rotational movement of the motor shaft 75 pivots the second connecting portion 41 which pivots the clamp member 31 between the engaged and disengaged positions.

An actuating means 73 may be provided for operating the motor 71. The actuating means 73 may be mountable in the cab of the vehicle. The actuating means 73 may be electrically connected to the motor 71.

A joining member 45 is provided for joining the steering assembly 12 to the cab of the semi-truck so that an operator in the cab can control the positioning of the rear wheels. The joining member 45 includes a first end 46 and a second end 47. The first end 46 of the joining member 45 is mounted on the three positioned valve 20 for directing the direction of the fluid flowing through the three-position valve.

An actuator assembly 50 is provided for actuating the joining member 45. The actuator assembly 50 may include a housing 51 that has a top wall 52 and a peripheral wall 53 extending away from the top wall 52. An annular flange 54 may be mounted on an edge 55 of the peripheral wall 53. The annular flange 54 may be mountable to a floor of the cab. The top wall 52 of the housing 51 may include an elongated hole 56 extending therein.

A switch 60 may be provided for pivotally adjusting the joining member 45. The switch 60 is pivotally mounted in the housing 51. An end 61 of the switch 60 may extend outwardly through the elongated hole 56 in the housing 51. A second end 62 of the switch 60 is preferably coupled to the second end 47 of the joining member 45.

Indicia 70 may be marked on the top wall 52 of the housing 51 for indicating the first and second directions. The indicia 70 may comprise a pair of arrows that are positioned generally adjacent to the hole 56.

In use, the lever 33 is positioned to the disengaged position so that the clamp member 31 frees the connecting member 26. Depending upon the direction of travel desired for the trailer, a user moves the switch 60 to adjust the position of the joining member 45 to achieve the desired degree of pivot of the trailer. The joining member 45 moves the three-position valve 20 to control the direction of the fluid flowing through the three-position valve 20 which moves the piston 18 in the cylinder 17 turning the wheels.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A steering system for steering the rear wheels of a semi-truck trailer, the semi-truck including a cab and a trailer, the trailer having bed portion, the wheels each being mounted on a rim, the rims of the wheels being coupled together by an axle, said system comprising:

a steering assembly mountable on the trailer for pivotally moving the rear wheels of the trailer between a first position, a second position and a third position with respect to a longitudinal axis of the trailer;

a joining member for joining said steering assembly to the cab of the semi-truck, a first end of said joining member being operationally coupled to said steering assembly;

an actuator assembly for actuating the joining member, a second end of said joining member being operationally coupled to said actuator assembly;

said steering assembly including a dual-acting pump assembly for pivotally moving the rear wheels between each of said position, said dual acting pump assembly being operationally couplable to at least one of the wheels;

said dual-acting pump assembly including:
  a reservoir being mountable on the trailer for holding a fluid;
  a pump being fluidly coupled to said reservoir for pumping fluid from said reservoir;
  a cylinder for receiving fluid flowing from said pump, said cylinder being fluidly coupled to said pump and to said reservoir;
  a piston being slidably mounted in said cylinder and being mountable to at least one of the wheels; and
  a three-position valve for directing fluid flowing from said pump to said cylinder, said three-position valve being fluidly coupled to said pump, said reservoir, and said cylinder;

an elongated coupling member for coupling each of the wheels together, said coupling member having a pair of end portions each being pivotally coupled to one of the wheels, wherein said coupling member transfers a directional movement of the rear wheel coupled to the piston to the rear wheel not coupled to the piston;

a clamp member for clamping on to said coupling member and preventing said coupling member from moving from said third position toward said first or second positions; and a lever for removably securing said clamp member to a portion of said coupling member, an end of said lever being pivotally mounted on the bed of the trailer.

2. The steering system of claim 1, wherein said first position is characterized by each of the rear wheels being positioned such that the trailer moves in a leftward direction with respect to the longitudinal axis of the trailer; wherein said second position is characterized by each of the rear wheels being positioned such that the trailer moves in a rightward direction with respect to the longitudinal axis of the trailer, wherein said third position is characterized by the wheels being positioned such that the trailer moves in a straight direction when the trailer is traveling in a forward or reverse direction.

3. The steering system of claim 1, wherein fluid flowing from said pump and traveling through said three-position valve moves said piston.

4. The steering system of claim 1, additionally including a linkage for coupling said piston to one of the rims of the wheels, a first end of said linkage being coupled to an end of said piston, a second end of said linkage being couplable to the rim of the wheel.

5. The steering system of claim 1, additionally including a securing assembly for securing the wheels in said third position, said securing assembly being releasably coupled to said coupling member.

6. The steering system of claim 1, wherein said lever is positionable between an engaged position and a disengaged position, wherein said engaged position s characterized by said clamp member being coupled to said coupling member, wherein said disengaged position is characterized by said clamp member being disengaged from said coupling member.

7. The steering system of claim 6, additionally including a connecting member for connecting said lever to said coupling member, a first end of said connecting member being coupled to said lever, said clamp member being mounted on a second end of said connecting member.

8. The steering system of claim 7, wherein said connecting member has a bend therein such that a first connecting portion and a second connecting portion of said connecting member are defined, wherein said first connecting portion is coupled to said lever, said second connecting portion being coupled to said clamp.

9. The steering system of claim 8, wherein moving said lever from said disengaged position toward said engaged position rotates said first connecting portion of said connecting member along a longitudinal axis of said first connection portion, rotational movement of said first connecting portion rotates said second connecting portion in a plane orientated generally perpendicular to said first connecting portion, wherein said clamp member engages said coupling member in said engaged position.

10. The steering system of claim 9, additionally including:
a motor for remotely operating said securing assembly, said motor being mountable to a lower surface of the bed of the trailer, said motor having a motor shaft extending away from said motor, said motor shaft being mounted to said second connecting portion of said connecting member, wherein rotational movement of said motor shaft pivots said second connecting portion moving said clamp member between said engaged and disengaged positions; and an actuating means for operating said motor, said actuating means being mountable in the cab of the vehicle, said actuating means being electrically.

11. The steering system of claim 9, wherein said actuator assembly includes:
a housing having an elongated hole extending into a top wall of said housing; and
a switch for pivotally adjusting the connecting member, said switch being pivotally mounted in said housing, an end of said switch extending outwardly through said elongated hole in said housing, a second end of said switch being coupled to a second end of said joining member, wherein said switch adjusts said three-position valve.

12. A steering system for steering the rear wheels of a semi-truck trailer, the semi-truck including a cab and a trailer, the trailer having bed portion, the wheels each being mounted on a rim, the rims of the wheels being coupled together by an axle, said system comprising:
a steering assembly mountable on the trailer for pivotally moving the rear wheels of the trailer;
a joining member for joining the steering assembly to the cab of the semi-truck, a first end of said joining member being operationally coupled to said steering assembly;
an actuator assembly for actuating the joining member, a second end of said joining member being operationally coupled to said actuator assembly;
said steering assembly being adapted for pivoting the rear wheels of the trailer between a first position, a second position, and a third position with respect to a longitudinal axis of the trailer;
wherein said first position is characterized by each of the rear wheels being positioned such that the trailer moves in a leftward direction with respect to the longitudinal axis of the trailer, said second position is characterized by each of the rear wheels being positioned such that the trailer moves in a rightward direction with respect to the longitudinal axis of the trailer, and said third position is characterized by the wheels being positioned such that the trailer moves in a straight direction when the trailer is traveling in a forward or reverse direction;
said steering assembly including a dual-acting pump assembly for pivotally moving the rear wheels between each of said positions, said dual acting pump assembly being operationally coupled to at least one of the wheels;
said dual-acting pump assembly including:
a reservoir for holding a fluid, said reservoir being mounted on the trailer;
a pump for pumping fluid from said reservoir and for pumping fluid away from said pump, said pump being fluidly coupled to said reservoir;
a cylinder for receiving fluid flowing from said pump, said cylinder being fluidly coupled to said pump and fluidly coupled to said reservoir;
a piston for engaging the rear wheels, said piston being slidably mounted in said cylinder, said piston being mountable to at least one of the wheels; and
a three-position valve for directing fluid flowing from said pump to said cylinder, said three-position valve being fluidly positioned between and fluidly coupled to said pump and said reservoir, said three-position valve being fluidly coupled to said cylinder;
a linkage for coupling said piston to one of the rims of the wheels, a first end of said linkage being coupled to an end of said piston, a second end of said linkage being couplable to the rim of the wheel;
an elongated coupling member for coupling each of the wheels together, said coupling member having a pair of end portions pivotally coupled to one of the wheels, wherein said coupling member transfers a directional movement of the rear wheel coupled to the piston to the rear wheel not coupled to the piston;

a securing assembly for securing the wheels in said third position, said securing assembly being releasably coupled to said coupling member;

a clamp member for clamping on to said coupling member and preventing said coupling member from moving from said third position toward said first or second position; and a lever for removably securing said clamp member to a portion of said coupling member, an end of said lever being pivotally mounted on the bed of the trailer.

13. The steering system of claim 10, wherein said lever is positionable between an engaged position and a disengaged position, wherein said engaged position is characterized by said clamp member being coupled to said coupling member, wherein said disengaged position is characterized by said clamp member being disengaged from said coupling member.

14. The steering system of claim 13, additionally including a connecting member for connecting said lever to said coupling member, a first end of said connecting member being coupled to said lever, said clamp member being mounted on a second end of said connecting member.

15. The steering system of claim 14, wherein said connecting member has a bend therein such that a first connecting portion and a second connecting portion of said connecting member are defined, wherein said first connecting portion is coupled to said lever, said second connecting portion being coupled to said clamp.

16. The steering system of claim 15, wherein moving said lever from said disengaged position toward said engaged position rotates said first connecting portion of said connecting member along a longitudinal axis of said first connection portion, rotational movement of said first connecting portion rotates said second connecting portion in a plane orientated generally perpendicular to said first connecting portion, wherein said clamp member engages said coupling member in said engaged position.

17. The steering system of claim 16, additionally including:

a motor for remotely operating said securing assembly, said motor being mountable to a lower surface of the bed of the trailer, said motor having a motor shaft extending away from said motor, said motor shaft being mounted to said second connecting portion of said connecting member, wherein rotational movement of said motor shaft pivots said second connecting portion moving said clamp member between said engaged and disengaged positions; and an actuating means for operating said motor, said actuating means being mountable in the cab of the vehicle, said actuating means being electrically.

18. The steering system of claim 16, wherein said actuator assembly includes:

a housing having an elongated hole extending into a top wall of said housing; and a switch for pivotally adjusting the connecting member, said switch being pivotally mounted in said housing, an end of said switch extending outwardly through said elongated hole in said housing, a second end of said switch being coupled to a second end of said joining member, wherein said switch adjusts said three-position valve.

19. A steering system for steering the rear wheels of a semi-truck trailer, the semi-truck including a cab and a trailer, the trailer having a bed portion, the wheels each being mounted on a rim, the rims of the wheels being coupled together by an axle, said system comprising:

a steering assembly mountable on the trailer for pivotally moving the rear wheels of the trailer between a first position, a second position and a third position with respect to a longitudinal axis of the trailer when the trailer is moving in a reverse direction;

wherein said first position is characterized by each of the rear wheels being positioned such that the trailer moves in a leftward direction with respect to the longitudinal axis of the trailer;

wherein said second position is characterized by each of the rear wheels being positioned such that the trailer moves in rightward direction with respect to the longitudinal axis of the trailer;

wherein said third position is characterized by the wheels being positioned such that the trailer moves in a straight direction when traveling forward or reverse;

wherein said steering assembly includes a dual-acting pump assembly for pivotally moving the rear wheels between each of said positions, said dual-acting pump assembly including:

a reservoir for holding a fluid, said reservoir being mounted on a lower surface of the bed of the trailer;

a pump for pumping fluid from said reservoir and for pumping fluid away from said pump, said pump being fluidly coupled to said reservoir;

a cylinder for receiving fluid flowing from said pump, said cylinder being fluidly coupled to said pump and fluidly coupled to said reservoir;

a piston for engaging the rear wheels, said piston being slidably mounted in said cylinder;

a three-position valve for directing fluid flowing from said pump to said cylinder, said three-position valve being positioned generally between and fluidly coupled to said pump and said reservoir, said three-position valve being fluidly coupled to said cylinder;

wherein fluid flowing from said pump and traveling through said three-position valve moves said position;

a linkage for coupling said piston to one of the rims of the wheels, a first end of said linkage being coupled to an end of said piston, a second end of said linkage being coupled to the rim of the wheel;

an elongated coupling member for coupling the rims of each of the wheels together, said coupling member having a pair of end portions pivotally extending away therefrom, each end portion being pivotally coupled to one of the rims of the wheels;

wherein said coupling member transfer a directional movement of the rear wheel coupled to the piston to the rear wheel not coupled to the piston;

a securing assembly for securing the wheels in said third position, said securing assembly including:

a clamp member for clamping on to said coupling member and preventing said coupling member from moving from said third position toward said first and second position;

a lever for removably securing said clamp member to a portion of said coupling member, an end of said lever being pivotally mounted on the bed of the trailer, said lever being positionable between an engaged position and a disengaged position, wherein said engaged position is characterized by said clamp member being coupled to said coupling member, wherein said disengaged member is characterized by said clamp member being disengaged from said coupling member;

a connecting member for connecting said lever to said coupling member, said connecting member having a first end and a second end, said first end of said connecting member being coupled to said lever, said clamp member being mounted on said second end of said connecting member, said connecting member having a bend therein such that a first connecting portion and a second connecting portion of said connecting member are defined;

wherein said first connecting portion is coupled to said lever, said second connecting portion being coupled to said clamp;

wherein moving said lever from said disengaged position toward said engaged position rotates said first connecting portion of said connecting member along a longitudinal axis of said first connecting portion, rotational movement of said first connecting portion rotates said second connecting portion in a plane orientated generally perpendicular to said first connecting portion; and wherein said clamp member engages said coupling member in said engaged position;

a joining member for joining said steering assembly to the cab of the semi-truck, said joining member having a first end and a second end, said first end of said joining member being mounted on said three-position valve;

a motor for remotely operating said securing assembly, said motor being mountable to a lower surface of the bed of the trailer, said motor having a motor shaft extending away from said motor, said motor being electrically connectable to a power supply of the vehicle;

said motor shaft being mounted to said second connecting portion of said connecting member, wherein rotational movement of said motor shaft pivots said second connecting portion moving said clamp member between said engaged and disengaged positions;

an actuating means for operating said motor, said actuating means being mountable in the cab of the vehicle, said actuating means being electrically connected to said motor;

an actuator assembly for actuating the joining member, said actuator assembly including:

a housing having a top wall and a peripheral wall extending away from said top wall, an annular flange being mounted on an edge of said peripheral wall, said annular flange being mountable to a floor of the cab, said top wall of said housing having an elongated hole extending therein;

a switch for pivotally adjusting the joining member, said switch being pivotally mounted in said housing, an end of said switch extending outwardly through said elongated hole in said housing, an end of said switch being coupled to said second end of said joining member, wherein said switch adjusts said three-position valve; and indicia being marked on said top wall of said housing for indicating said first and second directions, said indicia comprising a pair of arrows being positioned generally adjacent to said hole.

\* \* \* \* \*